May 12, 1970     E. RHEAULT     3,511,113

HYDRAULIC TRANSMISSION

Filed June 26, 1968

INVENTOR
Emile RHEAULT
BY
Pierre Lespérance

PATENT AGENT

United States Patent Office 3,511,113
Patented May 12, 1970

3,511,113
HYDRAULIC TRANSMISSION
Emile Rheault, 6478 Chauvin St., Montreal,
Quebec, Canada
Filed June 26, 1968, Ser. No. 740,339
Claims priority, application Canada, Apr. 2, 1968,
16,564
Int. Cl. F16h 3/58; F16d 31/00
U.S. Cl. 74—794                                    10 Claims

ABSTRACT OF THE DISCLOSURE

The present invention relates to a hydraulic transmission and, more particularly, to a variable velocity ratio gearing connecting a driving and a driven shaft, in which the velocity ratio is automatically changed by variation of the speed of the driving shaft or by variation of the load on the driven shaft, said gearing comprising planetary gears carried by a cage submitted to the braking effect of a liquid.

---

The present invention relates to a hydraulic transmission and, more particularly, to a variable velocity ratio gearing connecting a driving and a driven shaft, in which the velocity ratio is automatically changed by variation of the speed of the driving shaft or by variation of the load on the driven shaft, said gearing comprising planetary gears carried by a cage submitted to the braking effect of a liquid.

The general object of the invention is to provide a transmission adapted to replace the conventional assembly of automatic transmission and torque converters in motor vehicles and in other applications wherein it is desired to obtain a variable velocity ratio between a driving and a driven shaft.

Another object of the invention resides in the provision of a system of the character described, which is capable of producing a velocity ratio of nearly 1 to 1 between the driving and the driven shaft at a certain speed of rotation of the shafts.

Another object of the invention resides in the provision of a system of the character described, which is of simple and inexpensive construction.

Another object of the present invention resides in the provision of a system of the character described, in which the vanes carried by the cage are adjustable with the velocity of rotation of the cage, in order to vary the braking effect produced by the liquid in the hydraulic transmission.

The foregoing and other objects of the present invention will become more apparent during the following disclosure and by referring to the drawings, in which.

In the drawings, like reference characters indicate like elements throughout.

Figure 2:
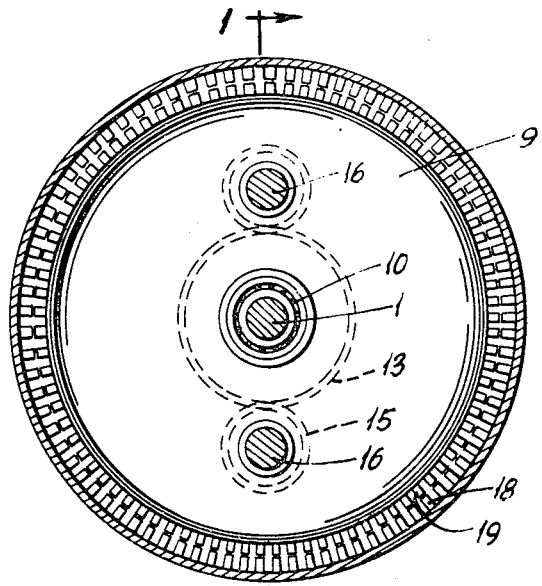
FIG. 2 is a cross-section taken along line 2—2 of FIG. 2.

The transmission in accordance with the invention comprises a driving shaft 1 and a driven shaft 2 which are axially aligned and their proximate ends 3 and 4 respectively are close to one another and may be maintained in alignment by a bushing, a collar or the like, not shown.

A housing 5 is keyed at 6 to the driving shaft 1 and is rotatably mounted by ball bearings 7 on the driven shaft 2. Housing 5 preferably has a generally cylindrical shape and forms a completely closed enclosure the bearing 7 being provided with suitable seals, not shown. The housing 5 is preferably made in two parts bolted together at 8 for assembly and disassembly of the mechanism.

A cage 9 is located within the housing 5 and is rotatably mounted on the shaft ends 3 and 4 by means of ball bearings 10, which may be thrust bearings.

Figure 3:
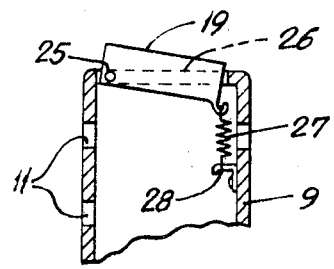
FIG. 3 is a longitudinal section of the outer portion of the cage showing a modified arrangement of the vane or impeller blade.
Figure 1:
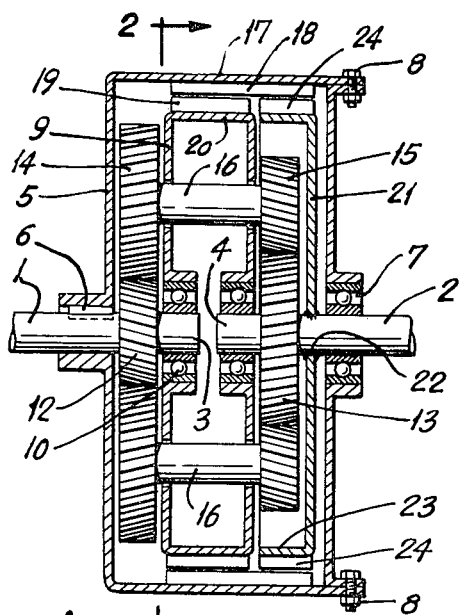
FIG. 1 is a longitudinal section of the transmission mechanism, taken along line 1—1 of FIG. 2.

The cage 9 is located at the centre of the housing and is preferably perforated in its side walls, as shown at 11 in FIG. 3, for access of fluid therein.

Driving shaft 1 carries a pinion 12 on the outside of cage 9, while driven shaft 2 carries a pinion 13 on the outside of the cage. Driving pinion 12 has a smaller diameter than driven pinion 13.

Cage 9 carries two or more pairs of planetary gears 14 and 15 respectively keyed to a common shaft 16, said pairs of gears being equally angularly disposed and equally radially distant from the axis of the shafts 1 and 2.

Planetary gears 14 mesh with driving pinion 12, while planetary gears 15 mesh driven pinion 13. Obviously, the gears 14 have a greater diameter than the gears 15.

Although two pairs of planetary gears 14 and 15 are shown in the drawings, obviously three or more pairs of such gears could be provided.

Housing 5 has a peripheral wall 17 from which protrude radially inwardly a series of impeller vanes 18 disposed around the entire periphery of the wall 17. Said impeller vanes 18 are in close proximity with impeller vanes 19 radially protruding from the peripheral wall 20 of cage 9.

The vanes 19 protrude from the entire periphery of the cage 9. Vanes 18 and 19, as shown in the drawings, are disposed in planes intersecting the axes of the shafts 1 and 2; but they may be arranged at any angle desired and may be longitudinally curved, if so desired, as in torque converters of conventional construction.

A disc-like member 21 is secured at 22 to the driven shaft and is disposed within housing 5 on the outside of driven pinion 13 and driven planetary gears 15.

Disc 21 has a cylindrical flange 23 at the level of the peripheral wall 17 of housing flange. Flange 23 also carries a plurality of vanes 24, which extend radially outwardly therefrom along the entire periphery of the flange 23 and disposed in close proximity with the impeller vanes 18 of housing 5.

Vanes 24 are shown as beign straight blades intersecting the axis of shafts 1 and 2, but may be longitudinally curved and disposed at an angle to coact with the impeller vanes 18.

Obviously, vanes 18 of housing 5 could be extended along the lateral wall on the driven side of said housing and, similarly, the vanes 24 could be extended along the disc 21 to enable greater coaction between said vanes. Also, the arrangement could be modified so as to have the pinions and planetary gears arranged inside the cage 9 and the vanes 18 and 19 could extend along the lateral wall of the housing and cage respectively on the side of the driving shaft, so as to increase the coaction between said vanes 18 and 19.

The system in accordance with the invention operates as follows:

The housing is completely filled with a liquid, preferably a hydraulic oil such as used in torque converters. Supposing driven shaft 2 is held stationary, rotation of driving shaft 1 will cause rotation of housing 5 in the same direction but rotation of the cage 9 in the opposite direction.

Thus, the impeller vanes 18 of housing 5 rotate in a direction opposite to the impeller vanes 19 of cage 9 and there is immediately a force exerted by the impeller vanes 18 on the impeller vanes 19 tending to rotate the cage 9 in the same direction as housing 5, due to the presence of the hydraulic fluid.

Supposing pinion 12 is half the diameter of pinion 13, cage 9 will continue to rotate in the opposite direction to that of housing 5 until driven shaft 2 rotates at about one quarter the speed of driving shaft 1. At this one quarter speed, cage 9 will come to a standstill and then starts to rotate in the same direction as housing 5 with further increase in speed of shaft 2. There might be slippage between the vanes 18 and 19 and, consequently, the final rotation ratio between shafts 1 and 2 may be a little less than 1 to 1. In order to obtain practically a 1 to 1 velocity ratio, the vanes 24 carried by flange 23 and coacting with the impeller vanes 18 of housing 5, serve to further lock the housing and driven shaft into the same rotational speed.

The system of the invention therefore forms an automatic transmission in which the driven shaft will rotate at a speed in accordance with the load, and because the velocity ratio obtainable between the driving and driven shaft is practically 1 to 1, there is no need for any additional gearing between the two shafts, except a reverse box, The vanes on cage 9 and the flanged disc 21 may be movably mounted on said elements so as to come closer to the impeller vanes 18 of the housing 5 with increase of velocity of the cage and flanged disc.

Figure 4:
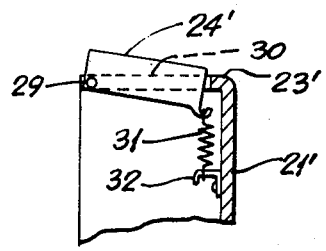
FIG. 4 shows in longitudinal section the outer portion of the flanged disc carrying a modified embodiment of the impeller blade or vane.

FIGS. 3 and 4 show such an arrangement in which impeller vanes 19′ carried by the cage 9′, are pivotally mounted at 25 at one end and are movable within a slot 26 of the cage 9′ and are urged radially inwardly at their other end by a tension spring 27 attached by bracket 28 to the cage 9′.

Similarly, the vanes 24′ carried by the flange 23′ of the disc 21′ are pivotally mounted at one end 29 and extend through a slot 30, while their other ends are urged radially inwardly by tension spring 31 attached to the disc 21′ by a bracket 32.

It will be appreciated that the vanes 19′ and 24′ will tend to pivot radially outwardly under centrifugal force against the action of the springs 27 and 31 with increase in the rotational speed of the cage and flanged disc.

This arrangement will produce a greater demultiplication ratio between the driving and driven shafts at low speed.

What I claim is:

1. A hydraulic transmission comprising axially aligned driving and driven shafts, a housing adapted to be filled with hydraulic fluid and keyed to said driving shaft and journalled on said driven shaft, first impeller vanes carried by an extending within said housing, a cage rotatably mounted within said housing, second vanes carried by the outside of said cage close to said first vanes, pairs of planetary gears rotatably carried by said cage, pinions carried by the respective shafts and meshing with the respective planetary gears of each pair respectively, a disc-like member secured to said driven shaft and third vanes carried by said member close to said first vanes.

2. A hydraulic transmission as claimed in claim 1, wherein said cage is rotatably mounted on said shafts.

3. A hydraulic transmission as claimed in claim 1, wherein said housing, cage and disc member each has a peripheral cylindrical wall, said first vanes protruding radially inwardly from the peripheral wall of said housing and said second and third vanes protruding radially outwardly from the peripheral wall of the cage and of the disc member respectively.

4. A hydraulic transmission as claimed in claim 1, wherein said disc-like member has a peripheral cylindrical flange and said third vanes are movably carried by said flange and constitute centrifugal masses arranged to move closer to said first vanes with increasing speed of rotation of said cage.

5. A hydraulic transmission as claimed in claim 4 wherein said cage is rotatably mounted on said shafts.

6. A hydraulic transmission as claimed in claim 1, wherein said housing, cage and disc-like member each has a peripheral cylindrical wall, said first vanes protruding radialy inwardly from the peripheral wall of said housing and said second and third vanes movably carried by and protruding radially outwardly from the peripheral wall of the cage and of the disc member respectively, said second and third vanes acting as centrifugal masses and moving closer to said first vanes with increasing speed of rotation of said cage and disc respectively.

7. A hydraulic transmission as claimed in claim 1, wherein said housing, cage and disc member each has a peripheral cylindrical wall, said first vanes protruding radially inwardly from the peripheral wall of said housing, said second vanes protruding radially outwardly from the peripheral wall of the cage, said third vanes pivotally carried by said peripheral wall of said disc member at one end and spring-loaded to normally take a radially inwardly inclined position, said third vanes pivoting outwardly with increasing speed of said disc-like member to come closer to said first vanes.

8. A hydraulic transmission comprising axially aligned driving and driven shafts, a housing adapted to be filled with hydraulic fluid and keyed to said driving shaft and journalled on said driven shaft, first impeller vanes carried by and extending within said housing, a cage rotatably mounted within said housing, second vanes movably carried by said cage and extending on the outside thereof close to said first vanes, means to move said second vanes closer to said first vanes, with increasing speed of rotation of said cage, pairs of planetary gears rotatably carried by said cage, pinions carried by the respective shafts and meshing with the respective planetary gears of each pair respectively, the pinion of the driving shaft having a smaller diameter than the pinion of said driven shaft.

9. A hydraulic transmission as claimed in claim 8, wherein said housing and cage each has a peripheral cylindrical wall, said first vanes protruding radially inwardly from the peripheral wall of said housing and said second vanes protruding radialy outwardly from the peripheral wall of said cage.

10. A hydraulic transmission as claimed in claim 8, wherein said second vanes are pivotally carried by said cage at one end and spring-loaded to normally take a radially inwardly inclined position, said second vanes pivoting outwardly with increasing speed of rotation of said cage.

References Cited

UNITED STATES PATENTS

| 2,250,082 | 7/1941 | Robinson | 74—794 |
|---|---|---|---|
| 2,543,878 | 3/1951 | Stewart | 74—688 |
| 2,637,219 | 5/1953 | Stewart | 74—794 X |
| 2,590,305 | 3/1952 | Foster | 74—794 |
| 3,204,736 | 9/1965 | Trimmer | 192—58 |
| 3,228,500 | 1/1966 | Hollander | 192—58 |
| 3,351,168 | 11/1967 | Thorpe | 192—61 |

ARTHUR T. McKEON, Primary Examiner

U.S. Cl. X.R.

192—61